E. J. WELFFENS.
BELT GEARING ATTACHMENT FOR ROLLER SHAFTS.
APPLICATION FILED MAY 4, 1916.

1,220,304.

Patented Mar. 27, 1917.
2 SHEETS—SHEET 1.

Emile John Welffens
Inventor.
by Laurence Langner
Attorney

E. J. WELFFENS.
BELT GEARING ATTACHMENT FOR ROLLER SHAFTS.
APPLICATION FILED MAY 4, 1916.

1,220,304.

Patented Mar. 27, 1917.
2 SHEETS—SHEET 2.

Emile John Welffens
Inventor
by Lawrence Langner
Attorney.

UNITED STATES PATENT OFFICE.

EMILE JOHN WELFFENS, OF DIDSBURY, MANCHESTER, ENGLAND, ASSIGNOR TO HANS RENOLD LIMITED, OF MANCHESTER, ENGLAND.

BELT-GEARING ATTACHMENT FOR ROLLER-SHAFTS.

1,220,304.  Specification of Letters Patent.  Patented Mar. 27, 1917.

Application filed May 4, 1916. Serial No. 95,422.

*To all whom it may concern:*

Be it known that I, EMILE JOHN WELFFENS, a subject of the King of the Belgians, and resident of Burnage Works, Didsbury, Manchester, England, have invented certain new and useful Improvements in Belt-Gearing Attachments for Roller-Shafts, of which the following is a specification.

This invention relates to the driving mechanism for "roller shafts" such as are used in spinning frames, doubling frames and the like, for actuating the spindles through driving bands passed around such rollers. These rollers are generally called "tin rollers." It is the object of the present invention to provide a positive belt driving mechanism which shall actuate both tin rollers simultaneously, driving them at the same speed and so avoiding the slip which is liable to arise if only one tin roller is driven, and if the spindle-driving-bands are left to actuate the other.

It is a further object of the present invention to enable the positive driving of the two tin rollers to be effected by means of positive driving belts, hereinafter referred to as chains without the use of any brackets and so forth fixed to the machine frame, but solely by members supported on the shafts of the tin rollers themselves.

A still further object is to enable such a driving mechanism to be provided which shall be automatically alined in the fitting thereof to the shafts, this being effected by the construction of the mechanism so that when the parts are put together in contact one with another upon the shafts, the chain wheels are as a matter of course in alinement.

The invention is illustrated in the accompanying drawings, wherein:—

Figure 1:
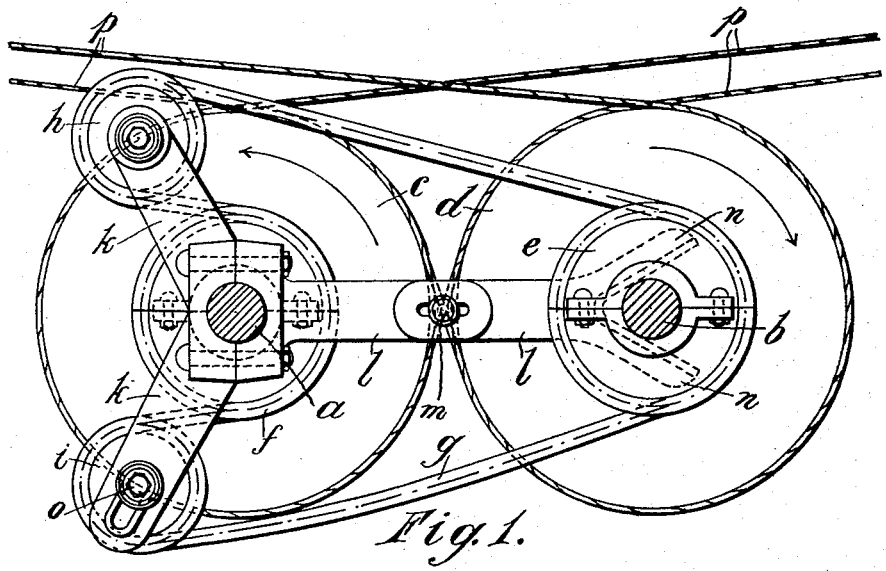
Figure 1 is a side elevation showing one construction.
Figure 3:
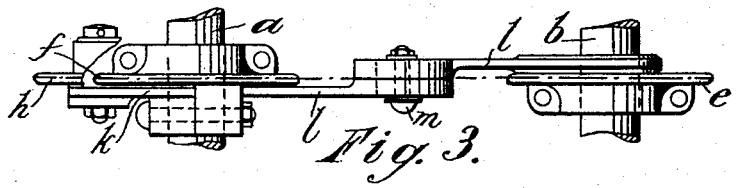
Figure 4:
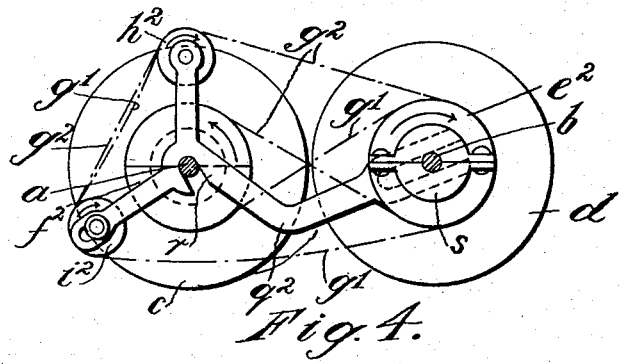
Figure 5:
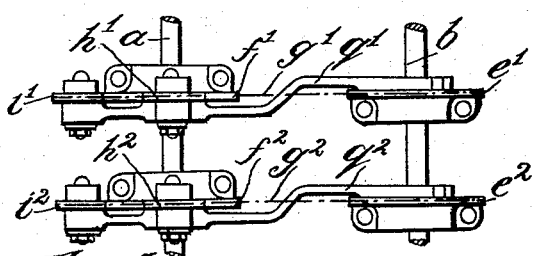
Figure 6:
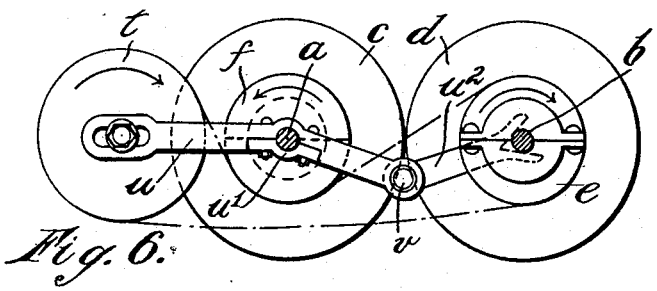
Figure 7:
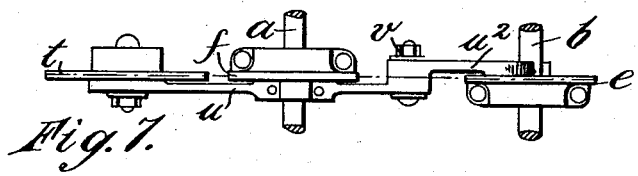
Figure 8:
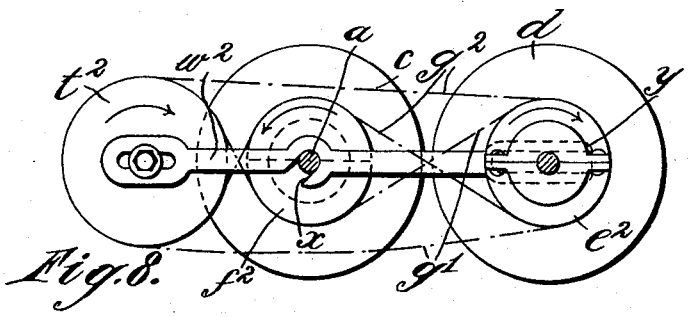
Figure 9:
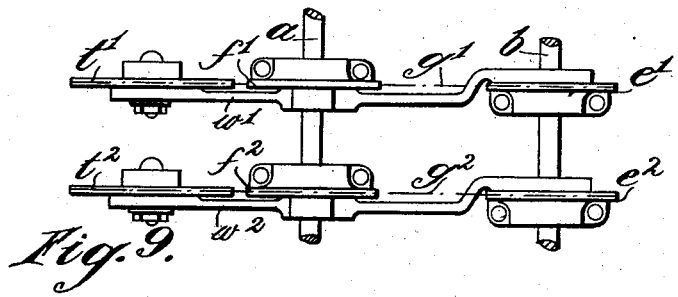
Figure 10:
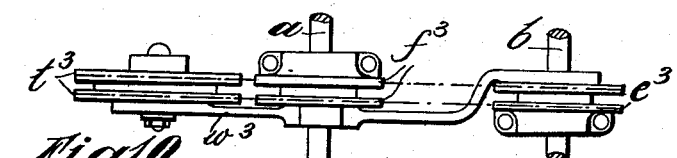

Fig. 3 a plan view, partly broken away;

Fig. 4 is a similar view to Fig. 1, but on a smaller scale showing a modified construction;

Fig. 5 shows a plan view thereof;

Figs. 6 and 7 show another modification in elevation and plan respectively;

Figs. 8 and 9 show a further modification in elevation and plan respectively;

Fig. 10 shows a modification of Fig. 9.

Figure 2:
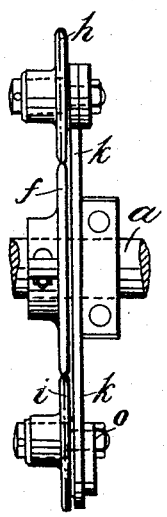
Fig. 2 is an end view thereof.

Referring first to Figs. 1, 2 and 3, $a$ and $b$ are the shafts of the two tin rollers $c$ and $d$, and it may be assumed that the shaft $b$ is power-driven, so that it is required to transmit the drive from this shaft to the shaft $a$. For this purpose a chain sprocket wheel $e$ is provided, preferably made in two parts so that it can be clamped upon the shaft $b$ without removing it from its bearings. A similar sprocket wheel $f$ of the same size is clamped on the shaft $a$. The chain $g$ is passed around the sprocket wheel $e$ and around two jockey wheels $h$ and $i$ from which it passes back again and around the sprocket wheel $f$. The result is to drive the sprocket wheel $f$ in a reverse direction as compared with that in which the sprocket wheel $e$ rotates. The jockey wheels $h$ and $i$ are mounted on arms $k$ which form part of or are attached to a split boss adapted to surround the shaft $a$, and to bear thereon. The other half of this boss consists of a member or arm $l$ with a slotted joint therein at $m$ in order to provide for adjustment of the length of the arm $l$, and with a forked end as shown at $n$ adapted to engage against the shaft $b$. In place of a forked end another split bearing might be used serving the same purpose.

In setting up the drive it is only necessary to clamp the sprocket wheel $e$ to the shaft $a$, to apply the split boss carrying the arms $k$ and $l$ to the shaft $a$ against the face of wheel $e$, to adjust the length of the arm $l$ so that the forked end $n$ or its equivalent bears effectively upon the shaft $b$ so as to hold the arms $k$ steadily in position, and to apply the sprocket wheel $f$ to shaft $b$ against the forked end of arm $l$, when the wheels $e$ and $f$ will be in alinement, as also will the jockey wheels $h$ and $i$, this alinement being assured by the design and construction of the members $k$ and $l$, to bear against the faces of the sprocket wheels as shown. The chain is then applied as shown, and the adjustment of one or both of the jockey wheels $h$ and $i$ enables the tension of the chain to be adjusted as required. The wheel $i$ is shown as having its bearing pin $o$ adjustable in a slot in the lower arm $k$ for this purpose.

With the shafts rotating in the direction shown in Fig. 1, while the shaft $b$ transmits the drive through the chain $g$ to the shaft $a$, it will be apparent that the top run of the chain is the tight one, and that any slack in the chain will come in the lower run thereof as is usually desired. The spindle-driving-bands which pass around the tin rollers $c$ and $d$ and away from these to the spindles to be driven, are indicated at $p$ and will need no further reference here, as they are arranged in precisely the usual manner. As both tin rollers are driven positively at the same speed, each band will be driven positively not only by lapping around about three-quarters of the circumference of the one tin roller, but also by its lapping around about a quarter of the circumference of the other tin roller, so that the driving of the bands is very effective.

Two or more chain drives constructed as indicated in Figs. 1 to 3 may be applied to transmit the drive between one pair of shafts, for instance at various positions thereon or at opposite ends thereof if required.

The construction need not necessarily be precisely that shown in Figs. 1 to 3, although in all cases the jockey wheels must be supported on arms forming part of a frame which is carried on the driving and driven shafts themselves, and requires no external attachments, while the said frame is arranged to bear against the faces of the sprocket wheels when in proper alinement, so as to render the alining practically automatic. Figs. 4 and 5 for example show diagrammatically a modification wherein the chain $g^1$ passes under the sprocket wheel $f^1$ on the shaft $a$, then over and around the sprocket wheel $e^1$ on the shaft $b$, and then around to jockey wheels $i^1$ and $h^1$ back to the wheel $f^1$. In this case also it is shown how the mechanism may be duplicated, the chain $g^1$ of the one mechanism being carried around the wheel $f^1$ in the one position, while the chain $g^2$ of the other mechanism is carried around the wheel $f^2$ in a reverse position. It will be noted in this case that the chain $g^1$ transmits the drive direct from wheel $e^1$ to wheel $f^1$, and the jockey wheels $h^1$, $i^1$ only carry the slack side of the chain. In Fig. 1 the jockey wheel $h$ carries the tight or driving side. If however a second mechanism is used with the chain arranged to pass as indicated at $g^2$ in Fig. 4, it is tight around both jockeys $h^1$ and $i^1$, and the slack thereof lies between the sprocket wheels $e^2$ and $f^2$. Figs. 4 and 5 also show a modified form of supporting structure, a single supporting member $q^1$ or $q^2$ being used which insures correct alinement in the manner described, and which rests by a slotted portion at $r$ on the shaft $a$ while the shaft $b$ also works through a slotted end $s$ thereof; the tension of the chain holds the supporting member $q^1$ or $q^2$ on the shafts during running.

Figs. 6 and 7 show a further modification wherein a single jockey wheel $t$ of large size replaces substantially the two jockey wheels $h^2$ and $i^2$ of Fig. 4. The supporting member is again shown in a somewhat modified construction, its arm $u$, which carries the jockey wheel $t$ by a pin and slot arrangement permitting of adjustment, being carried over the shaft $a$ and secured thereon by a removable part-bearing $u^1$, while an adjustable joint at $v$ carries another arm $u^2$ with a forked end like that shown at $n$ in Fig. 1, bearing against the shaft $b$. The joint at $v$ provides for adjustment according to the distance between the shafts $a$ and $b$, and if the joint has some free play so as to act as a slotted joint, it may also provide for adjustment of the height of the jockey wheel $t$ relative to the driven wheel $f$, thus controlling the amount of the lap of the chain around the driven wheel. With the arrangement shown in Fig. 6, the jockey wheel $t$ only carries the slack or return-run of the chain $g$.

Figs. 8 and 9 show a modified construction which is duplicated with chains $g^1$ and $g^2$ running around driven sprocket wheels on opposite sides thereof. A single large jockey wheel is used for each chain, these wheels being marked $t^1$ and $t^2$ in Fig. 9. The supporting member $w^1$ or $w^2$ is here shown as being in the form of a single bar with a slotted bearing at $x$ to lie over the shaft $a$, and a slotted end at $v$ embracing the shaft $b$. The chain $g^1$ passes around the sprocket wheel $e^1$ on shaft $b$, and under the sprocket wheel $f^1$ on shaft $a$ so that the jockey wheel $t^1$ carries the loose or return-run thereof. The chain $g^2$ however, passes over the sprocket wheel $f^2$ and around the jockey wheel $t^2$, and the top run thereof is therefore the tight side, the slack being between the sprocket wheels $e^2$ and $f^2$.

Fig. 10 shows how the result of Fig. 9 can be attained with the use of a single supporting member $w^3$, carrying a double chain wheel $t^3$ serving as jockey wheel for both chains. Each of the other chain wheels $f^3$ and $e^3$ may be made double also as shown.

The examples of construction above set forth will serve sufficiently to illustrate the possible applications of the invention in practice, and it will be seen that in every case the chain drive is supported solely on the two shafts by a structure which is adjustable and is self-alining, so that it can be fitted by unskilled labor provided that the parts are properly made. In practice the tin rollers generally used vary in diameter from about 9 inches to 11 inches, and their surfaces where nearest together are not much more or less than half an inch apart. It is easy therefore to construct the mechanism with this range of adjustment between the centers, so that it will be applicable practically to all existing frames. The shafts of the tin rollers vary in size, involving the use of bearings of different sizes to be applied thereto, but there are not many different sizes of shafts in general use so that it is not necessary to stock many different sets of parts to suit all frames. Any equivalent construction may be used instead of those hereinbefore described, provided that the one or more jockey wheels required for carrying the chain in the proper direction around one of the sprocket wheels on the tin roller shafts, is or are carried entirely by a structure which is itself supported on the shafts of the tin rollers, and is steadied and held in position thereby. The chains used may be single strand bush-roller chains or multiple strand chains, but they must be capable of gearing with chain wheels on both faces thereof. Further, wherever chains and chain wheels are referred to, it will be evident that any equivalent positive driving means such for instance as perforated flexible metal bands engaging with wheels having pins or projections thereon, are included within these terms.

Having thus described my invention what I claim as new and desire to secure by Letters Patent is:—

1. A mechanism for gearing together positively the shafts of two rollers around which spindle-driving-bands are carried, the said mechanism comprising the combination with the two roller shafts, of a sprocket wheel fixed on the shaft of one roller, a sprocket wheel fixed on the shaft of the other roller, a frame member supported on the two said shafts, said supporting frame member being so constructed and having means for supporting it on the two shafts such that it shall be applicable to shafts at varying distances apart, a chain and means carried by said supporting frame member for guiding the chain in such manner that it passes in one direction around one sprocket wheel and in a reverse direction around the other sprocket wheel whereby the shafts are geared together positively for turning in opposite directions of rotation.

2. A mechanism for gearing together positively the shafts of two rollers around which spindle-driving bands are carried, the said mechanism comprising the combination with the two roller shafts, of a sprocket wheel fixed on the shaft of one roller, a sprocket wheel fixed on the shaft of the other roller, a frame member supported on the two said shafts, said supporting frame member being so constructed and having means for supporting it on the two shafts such that it shall be applicable to shafts at varying distances apart, a chain and a pair of jockey wheels carried by said supporting frame member, said chain being carried around said two sprocket wheels and said pair of jockey wheels in such manner that the sprocket wheels are positively geared together to rotate in opposite directions, and means for adjusting the position of one of said jockey wheels whereby the tension of the chain may be adjusted.

3. A mechanism for gearing together positively the shafts of two rollers around which spindle-driving-bands are carried, the said mechanism comprising the combination with the two roller shafts, of a sprocket wheel fixed on the shaft of one roller, a frame member adapted to bear against one face of said sprocket wheel and to be supported on the two said shafts, another sprocket wheel fixed on the shaft of the other roller and adapted to bear against a face of said frame member, and to be in alinement with the first sprocket wheel under such conditions, a chain and means carried by said frame member for guiding the chain in such manner that it passes in one direction around one sprocket wheel and in a reverse direction around the other sprocket wheel, whereby the shafts are geared together positively for turning in opposite directions of rotation.

EMILE JOHN WELFFENS.

Copies of this patent may be obtained for five cents each, by addressing the "Commissioner of Patents, Washington, D. C."